(12) United States Patent
Vandeven et al.

(10) Patent No.: US 11,980,125 B2
(45) Date of Patent: May 14, 2024

(54) POSITION DETECTORS FOR STEERING SYSTEMS OF AGRICULTURAL HEADER TRANSPORT SYSTEMS

(71) Applicant: DEERE & COMPANY, Moline, IL (US)

(72) Inventors: Michael L. Vandeven, Le Claire, IA (US); Duane M. Bomleny, Geneseo, IL (US); Jixin Chen, Moline, IL (US); Adam J. Beals, Walcott, IA (US); Nicholis R. Fitzpatrick, Davenport, IA (US); Paul J. McCredie, Bettendorf, IA (US); Daniel S. Hoffman, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 669 days.

(21) Appl. No.: 17/248,441

(22) Filed: Jan. 25, 2021

(65) Prior Publication Data

US 2022/0192092 A1    Jun. 23, 2022

Related U.S. Application Data

(60) Provisional application No. 63/127,749, filed on Dec. 18, 2020.

(51) Int. Cl.
*A01D 41/00* (2006.01)
*A01D 41/127* (2006.01)
(Continued)

(52) U.S. Cl.
CPC ........... *A01D 41/127* (2013.01); *A01D 41/14* (2013.01); *B62D 13/00* (2013.01)

(58) Field of Classification Search
CPC .. A01D 41/127; A01D 41/14; A01D 41/1278; B62D 13/00; B62D 13/04; B62D 15/02
See application file for complete search history.

(56) References Cited

U.S. PATENT DOCUMENTS 4,212,483 A * 7/1980 Howard ................. B62D 13/06
                                                    280/103
4,579,362 A * 4/1986 Kirkpatrick .............. B60D 1/50
                                                    172/267
(Continued)

FOREIGN PATENT DOCUMENTS

EP    2574229 A1 *  4/2013  ............. A01D 41/14
FR    3029130 A1 *  6/2016  ............. B60D 1/245
(Continued)

*Primary Examiner* — Peter D Nolan
*Assistant Examiner* — Peter Y Ning (57) ABSTRACT

Systems and apparatuses for detecting an amount of steering articulation of a steering system are disclosed. The systems and apparatuses may be applied to steering systems of agricultural header transport systems. The systems and apparatuses may include a first component moveable with a first steering component and a second component that is movable with a second steering component. The first component and the second component may interact to generate a notification that a selected amount of steering articulation has occurred or is about to occur. The notification may be provided to an operator, such as in the form of a visual, audible, or haptic output.

15 Claims, 6 Drawing Sheets

(51) Int. Cl.
  *A01D 41/14*  (2006.01)
  *B62D 13/00*  (2006.01)

(56) References Cited

U.S. PATENT DOCUMENTS

| | | | | |
|---|---|---|---|---|
| 4,657,271 | A * | 4/1987 | Salmon | B62D 7/00 |
| | | | | 280/124.139 |
| 4,768,802 | A * | 9/1988 | Winkler | B62D 53/0864 |
| | | | | 280/81.6 |
| 8,761,972 | B2 * | 6/2014 | Morichika | B62D 1/265 |
| | | | | 701/19 |
| 9,004,519 | B1 * | 4/2015 | Beech | B62D 13/06 |
| | | | | 280/442 |
| 10,046,613 | B2 * | 8/2018 | Shepard | B60D 1/36 |
| 2002/0180178 | A1 * | 12/2002 | Masters | B62D 53/0871 |
| | | | | 280/426 |
| 2004/0081526 | A1 * | 4/2004 | Hoeper | F41A 9/87 |
| | | | | 410/42 |
| 2010/0025964 | A1 * | 2/2010 | Fisk | B62D 13/04 |
| | | | | 901/1 |
| 2011/0291373 | A1 * | 12/2011 | Dillard | B62D 13/025 |
| | | | | 280/81.6 |
| 2013/0075169 | A1 * | 3/2013 | Otto | B62D 11/04 |
| | | | | 180/6.24 |
| 2014/0008885 | A1 * | 1/2014 | Kim | B62D 7/10 |
| | | | | 280/98 |
| 2014/0367190 | A1 * | 12/2014 | Porcheron | A61G 5/10 |
| | | | | 280/93.508 |
| 2015/0210131 | A1 * | 7/2015 | Sallis, Sr. | B60B 1/155 |
| | | | | 280/442 |
| 2015/0282421 | A1 * | 10/2015 | Barnett | A01D 67/005 |
| | | | | 56/228 |
| 2015/0353291 | A1 * | 12/2015 | Teichrob | B65G 41/005 |
| | | | | 701/24 |
| 2016/0257368 | A1 * | 9/2016 | Aponte-Rivera | B62K 5/01 |
| 2016/0332666 | A1 * | 11/2016 | Manion | B62D 7/1509 |
| 2019/0337344 | A1 * | 11/2019 | Yu | B60R 1/003 |
| 2020/0086702 | A1 * | 3/2020 | Ling | B62D 15/0285 |
| 2020/0307732 | A1 * | 10/2020 | Staal | B62D 7/18 |
| 2021/0086785 | A1 * | 3/2021 | Niewiadomski | B60W 10/20 |
| 2021/0171098 | A1 * | 6/2021 | Beech | B60D 1/245 |

FOREIGN PATENT DOCUMENTS

| | | | | |
|---|---|---|---|---|
| KR | 20220006699 | A * | 1/2022 | |
| WO | WO-9912408 | A1 * | 3/1999 | B62D 13/005 |
| WO | WO-2016172729 | A1 * | 10/2016 | A01B 69/008 |
| WO | WO-2019037870 | A1 * | 2/2019 | |

* cited by examiner

POSITION DETECTORS FOR STEERING SYSTEMS OF AGRICULTURAL HEADER TRANSPORT SYSTEMS

CROSS-REFERENCE TO RELATED APPLICATIONS

This application claims the benefit of U.S. Provisional Application No. 63/127,749, filed Dec. 18, 2020, the entirety of which is incorporated herein by reference.

FIELD OF THE DISCLOSURE

The present disclosure relates generally to steering systems and, more particularly, to steering systems of agricultural header transport systems.

BACKGROUND OF THE DISCLOSURE

In many cases, agricultural headers are transported from one location to another using a trailer or a transport system integrated into the header to transport the header from one location to another. These systems provide for moving the header along roads, such as public roadways. When transporting an agricultural header, such as a corn header or draper header, the header is oriented so that a longitudinal axis of the header aligns with a direction of travel (as opposed to the longitudinal axis being perpendicular to a direction of travel, as is the case when the header is being used in an agricultural operation.)

SUMMARY OF THE DISCLOSURE

A first aspect of the present disclosure is directed to an apparatus for detecting a position of a steering system. The apparatus may include a first component movable with a first steering component and a second component, moveable with a second steering component, that interacts with the first component to indicate a position of the steering system.

A second aspect of the present disclosure is directed to an agricultural header transport system. The agricultural header transport system may include a first set of traction components disposed at a first end. The first set of traction components may include a first traction component and a second traction component. The first traction component may be pivotable about a first axis, and second traction component may be pivotable about a second axis different from the first axis. The agricultural header transport system may also include a second set of traction components disposed at a second end, opposite the first end and a steering system coupled to the first set of traction components. The steering system may include a tongue pivotably coupled to the first traction component and the second traction component and a protrusion extending from the tongue that contacts a portion of the agricultural header transport system at a selected amount of rotational displacement of the tongue. The first traction component and the second traction component may be pivotable about the first axis and the second axis, respectively, in response to a rotation of the tongue.

The various aspects may include one or more of the following features. The first component may include a first protruding portion extending from the first steering component. The second component may include a second protruding portion extending from the second steering components, and the first protruding portion may contact the second protruding portion to indicate the position of the steering system. The first steering component may include a tongue. The second steering component may include a tread of a tire coupled to the steering system. The second component may include a sensor that engages with the first protruding portion to indicate the position of the steering system. The first component may include a first portion of a rotary sensor, and the second component may include a second portion of the rotary sensor. The first portion of the rotary sensor and the second portion of the rotary sensor may be moveable relative to each other. The rotary sensor may be operable to detect the steering position of the steering system for a movement of the first portion of the rotary sensor relative to the second portion of the rotary sensor. An indicator may generate a notification of the position of the steering system upon interaction of the first component and the second component. The indicator may be one of an audible indication, a visual indication, or a haptic indication. A signal may be generated by the interaction between the first component and the second component. The signal may be transmitted to the indicator via a wired or wireless connection.

The various aspects may include one or more of the following features. The portion of the agricultural header transport system may include one of the first traction component or the second traction component. The protrusion may include a flexible rod configured to elastically deform in response to contact with the first traction component or the second traction component. The steering system may include a beam extending between the first traction component and the second traction component, and the portion of the agricultural header transport system may include a protrusion extending from the beam. The selected amount of rotational displacement of the tongue may include an amount of rotational displacement less than a full amount of rotational displacement of the tongue.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to steering systems and, more particularly, to position detection systems and apparatuses for steering systems that operate to detect an amount of articulation of the steering system. The various examples described herein are in the context of an agricultural header transport system. However, the concepts described are applicable to steering system of other types of vehicles. Steering position sensors provide for alerting an operator of a vehicle transporting an agricultural transport system that is used to carry an agricultural header, for example, when an amount of articulation of the steering system meets or exceeds a selected amount. Due to a size of the agricultural header transport system and the vehicle coupled thereto, an operator's perception of an amount of articulation of the steering system of the agricultural header transport system can be distorted due to the size of the equipment at issue as well as due to a reduced amount of steering response as the steering system approaches full articulation. That is, in many instances, as the steering system moves towards being fully articulated, an amount of increased steering change associated with an incremental amount of articulation of the steering system decreases. Consequently, it is difficult for an operator to perceive when the steering system of the agricultural header transport system has or is about to reach a limit. As a result, articulation of the steering can be exceeded, which can result in damage to the steering system, the agricultural header transport system, and, in some cases, damage to the header being transported. The steering systems and, particularly, steering systems having a steering position sensor provided herein notify an operator of an amount of steering and, in some instances, when an amount of steering has reached a selected amount.

Figure 1:
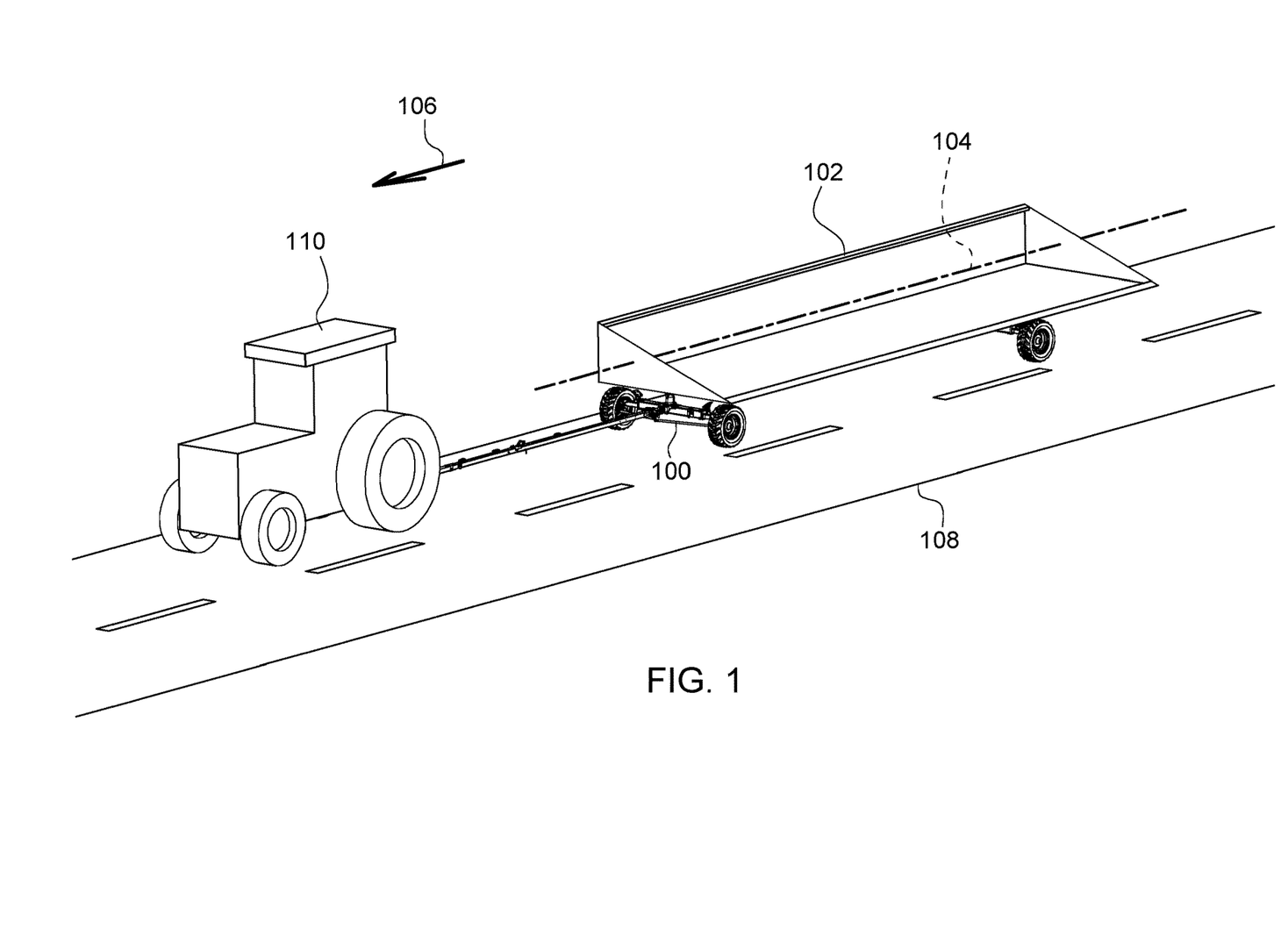
FIG. 1 is a perspective view of a header provided on an agricultural header transport system that is coupled to and being transported by a vehicle along a roadway, according to some implementations of the present disclosure.

Agricultural header transport systems, whether integral to an agricultural header or a separate device (e.g., a separate trailer), function to transport an agricultural header, such as a corn header or draper header, from one location to another along a roadway. As shown in FIG. 1, the agricultural header transport system 100 carries a header 102 in an orientation in which a longitudinal axis 104 of the header 102 is aligned with a direction of a travel 106. By orienting the header 102 in this way, the agricultural header transport system 100 provides for transporting the header along conventional roadways 108, e.g., streets and roads, while allowing the passage of oncoming vehicles in an opposing lane of the roadway.

A vehicle 110, such as a tractor or combine harvester, are often times employed to pull the agricultural header transport system 100. Here, FIG. 1 shows a tractor as being the vehicle 110. However, as explained, other types of vehicles can be used to transport the agricultural header transport system 100 and associated header 102.

Figure 2:
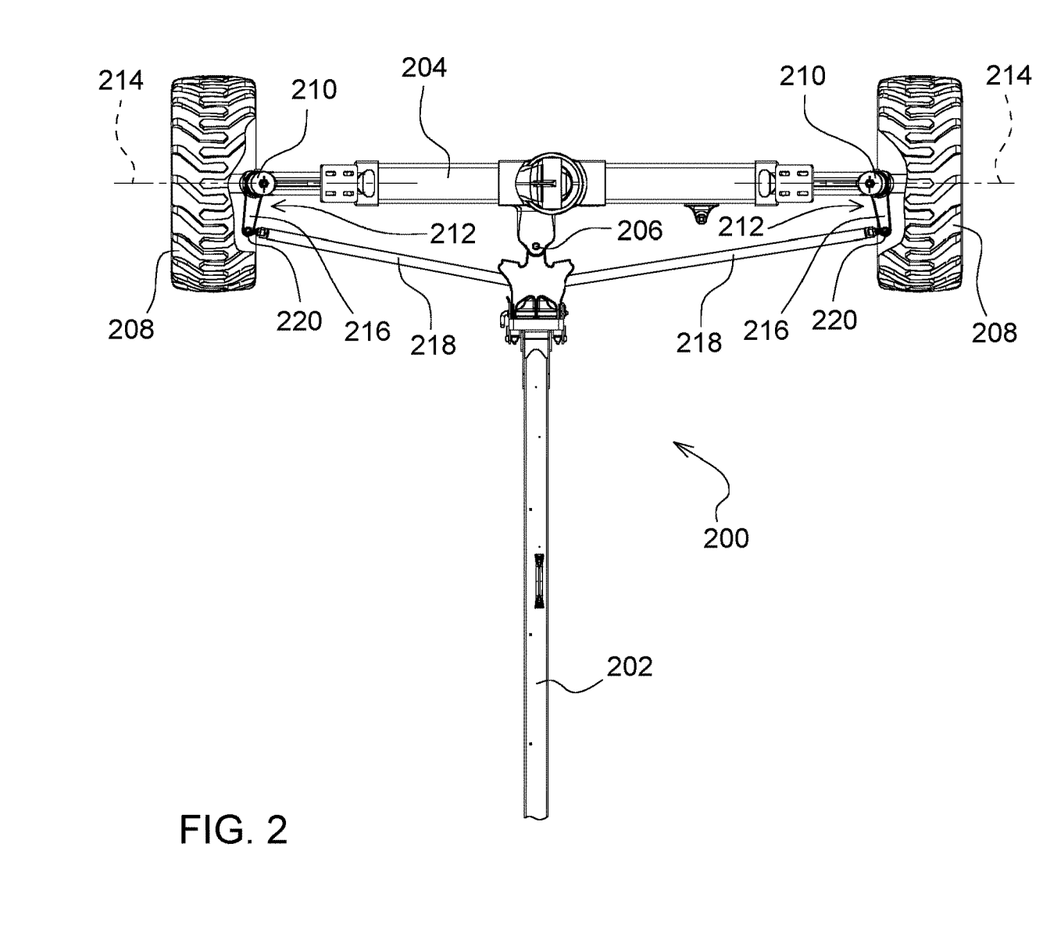
FIG. 2 is a partial cross-sectional plan view of an example steering system, according to some implementations of the present disclosure.

FIG. 2 is a plan view of an example steering system 200 within the scope of the present disclosure. The steering system 200 includes a tongue 202 that couples an agricultural header transport system to a vehicle used to transport the agricultural header transport system and header carried thereon. The tongue 202 is pivotably connected to beam 204 at pivot 206. In this example, the steering system 200 is an Ackermann steering system in which each wheel 208 of the steering system 200 pivots about a separate axes 210. The wheels 208 couple to the beam via a knuckle 212 that provides for rotation of the wheel 208 about individual axis 214 and rotation of the wheel about the axis 210. The knuckles 212 include a steering arm 216. The steering arms 216 are coupled to the tongue 202 via tie rods 218. The tie rods 218 are pivotably connected to the tongue 202 via pivots 220. The steering arms 216 are oriented such that, as the tongue 202 rotates about pivot 206, the wheel 208 on an inside of the turn are rotated about the pivot 210 by an amount greater than the amount by which the wheel 208 on the outside of the turn are rotated about the respective pivot 210. Thus, the steering system 200 of FIG. 2 utilizes Ackermann steering. Although wheels and associated tires are discussed in the context of the examples presented herein, other types of traction components are within the scope of the present disclosure. For example, traction components such as tracks assemblies having an endless track are within the scope of the present disclosure. For example, tracks within the scope include tracks similar to the tracks included on a 9RX tractor produced by Deere & Company of One John Deere Place, Moline, Illinois 61265.

Figure 5:
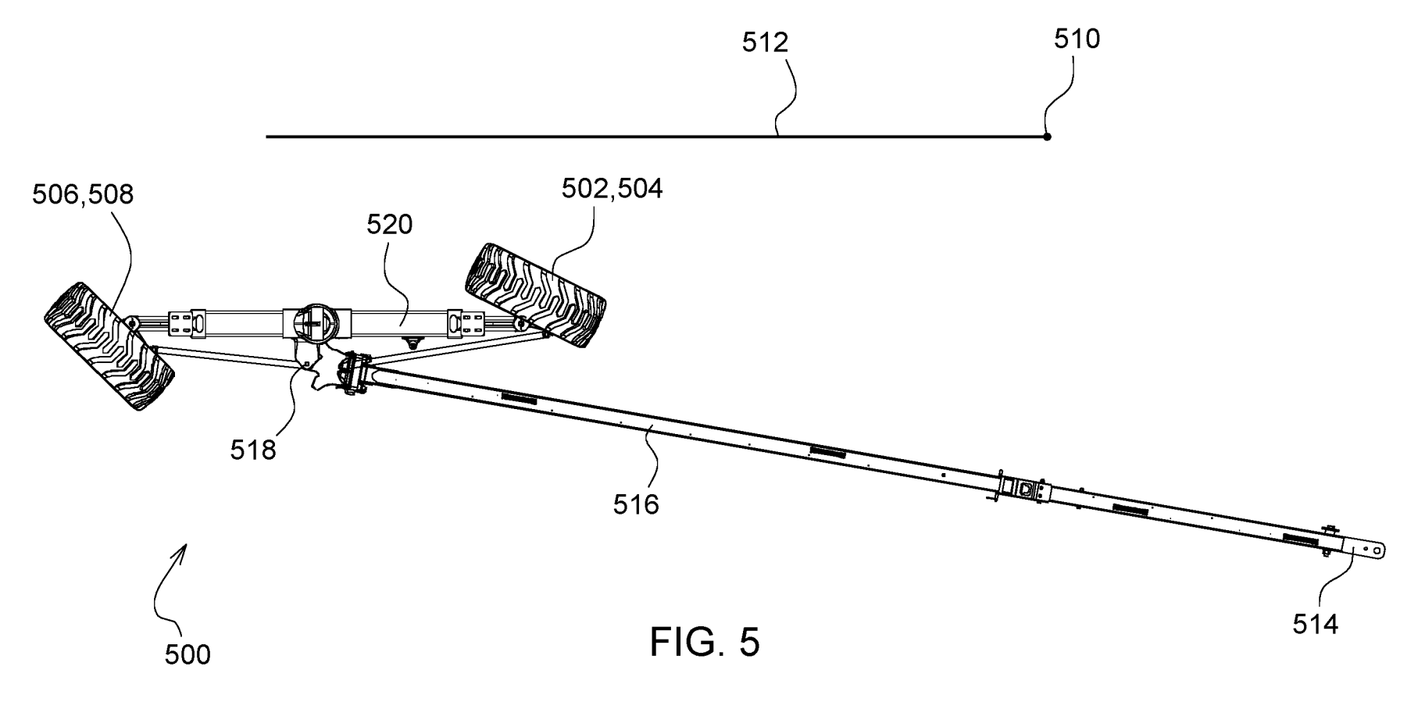
FIG. 5 is plan view of an example steering system in which a tongue of the steering system is articulated to produce a turn, according to some implementations of the present disclosure.

FIG. 5 shows a forward portion of an example steering system 500. The steering system 500 is similar to the steering system 200 shown in FIG. 2. Wheel 502 and associated tire 504 are located on an inside of the illustrated turn, and wheel 506 and associated tire 508 are on an outside of the turn. A wheel or tire that is on the "inside" of a turn is the wheel or tire, respectively, that more proximal to a center 510 of a radius 512 of the turn. The wheel or tire on the "outside" of a turn is the wheel or tire, respectively, that is more distal from the center 510 of the radius 512 of the turn. A distal end 514 of a tongue 516 of the steering system 500 is pointed towards the center 510 of the radius 512 of the turn.

Figure 3:
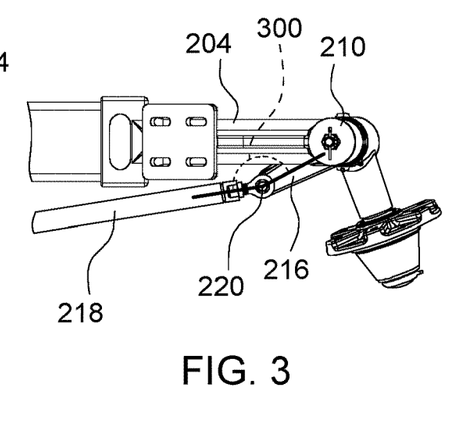
FIG. 3 is a detail view of a portion of the steering system of FIG. 2.
Figure 4:
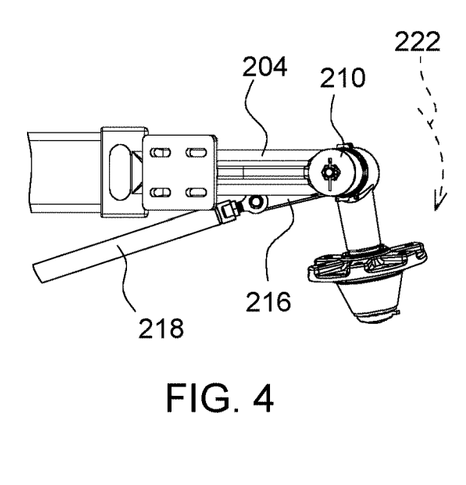
FIG. 4 is another detail view of a portion of the steering system of FIG. 2.

FIG. 3 shows a detail view of a portion of the steering system 200 of FIG. 2. As the tongue 202 continues to be articulated, such as during a turn, an angle 300 defined by the steering arm 216 and the tie rod 218 on the outside of a turn approaches 180°. Thus, if articulation of the tongue 202 continues, the steering arm 216 and the tie rod 218 may pass through an inflection point in which the outer wheel (i.e., the wheel located on the outside of a turn) may continue to rotate in the direction of arrow 222 as the tongue is rotated away from the turn, i.e., in a direction that tends to position the tongue 202 in a generally perpendicular orientation with the beam 204. As a result, the agricultural header transport system would become uncontrollable and likely to become damaged to the undesirable articulation between the tie rod 218 and the steering arm 216.

Avoiding over-articulation of a steering system can be avoided, such as by a limit stop, such as where a stationary component contacts another component moveable relative thereto in order to physically limit an amount of articulation. However, some steering systems may lack such an ability to limit steering articulation and, thus, the above-described behavior poses a problem. Consequently, an indication is useful in allowing an operator to avoid over-articulation of the steering system.

Another problem associated with increased articulation of the tongue is contact between the tongue and another component, such as contact with the wheel or associated tire located at the inside of the turn. Although FIG. 5 does not illustrate contact between tongue 516 and wheel 502 or tire 504, it will be appreciated that as the tongue 516 is permitted to continue rotation about an axis 518 between the tongue 516 and beam 520, contact between the tongue 516 and the wheel 502 or tire 504 or both will occur, resulting in damage to the steering system 500.

Figure 6:
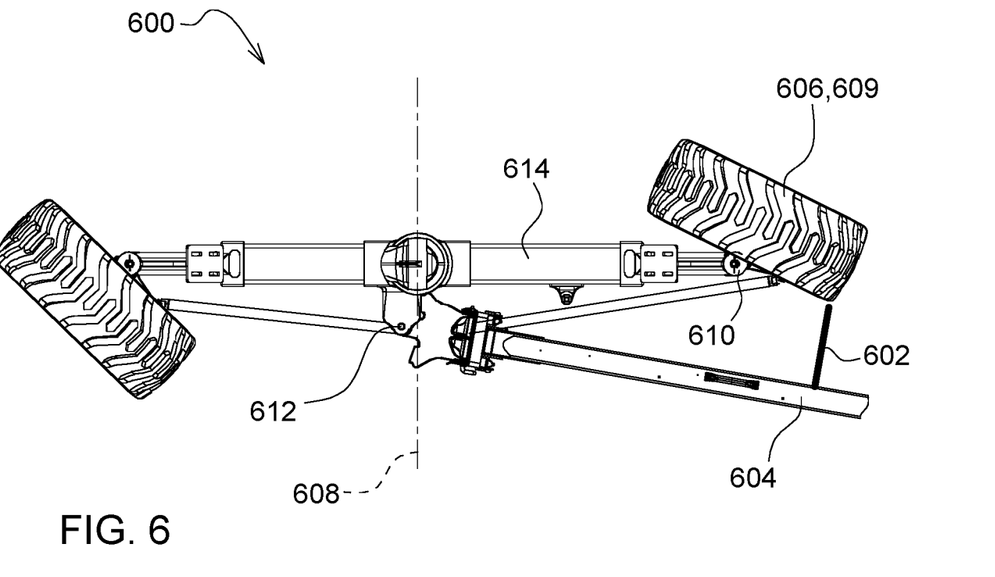
FIG. 6 is a plan view of another example steering system that includes a rod arranged to contact a tire when a select amount of pivoting of a tongue of the steering system has occurred, according to some implementations of the present disclosure.

In order to avoid at least these problems, the present disclosure provides for a sensor to detect an amount of articulation of a steering system, such as with a sensor that detects a proximity of one steering component relative to another. FIG. 6 shows a steering system 600 that includes a protrusion extending from tongue 604 of the steering system. In the illustrated example, the protrusion is in the form of a rod 602. The rod 602 encompasses any protruding component, whether coupled to the tongue 604 or integrally formed on the tongue 604 that is configured to contact another component to indicate an amount of articulation of the steering system 600. In some implementations, the rod 602 is formed from a resilient material to permit flexing of the rod 602 when engaged with another component. For example, the rod 602 may be formed from a plastic, metal, or other material that provides for non-yielding or non-destructive flexure when the rod 602 comes into contact with another component or feature, such as another feature of the steering system 600, during articulation of the tongue 604.

In the illustrated example, the rod 602 is configured to contact tire 606. In some implementations, the rod 602 In this example, the rod 602 is sized and positioned on the tongue 602 to contact the tire 606 at a selected amount of articulation of the tongue 604, such as during a turn. In some implementations, the rod 602 is positioned on the tongue 604 to engage tread on the tire such that the rod 602 is made to vibrate by movement of the tire tread during a turn. This visible vibration provides an optical notification to an operator of a vehicle pully an agricultural header transport system that includes the steering system 600. This visual indication is provided by the rod 602 is generally perceivable by the operator, such as the operator's peripheral vision. In some instances, during a turn, the operator is located in close proximity to the location where the tire 606 and the rod 602 engage each other. Thus, the resulting movement of the rod 602 is apparent to the operator, allowing the operator to take appropriate action, such as by halting additional articulation of the tongue 604 towards the tire 606 and avoiding damage to the steering system 600.

Sensors as encompassed by the present disclosure provide valuable feedback to an operator. Referring to FIG. 6, as an angular amount by which the tongue 604 of a steering system 600 is displaced from a reference position 608 (which, in this example, corresponds to a straight-ahead or non-turning position of the tongue 604) increases, an amount by which wheel 609 (that carries the tire 606) is correspondingly rotated about axis 610 decreases. This variance results, for example, from steering geometry of the steering system 600. As a result, as an operator approaches an end of available rotation of the tongue 604 about axis 612 formed between the tongue 604 and beam 614, an amount of perceivable change in rotation of the wheel 609 about the axis 610 is reduced. Consequently, an operator may have difficulty judging an amount by which the wheel 609 has been rotated about axis 610 for a given steering input as the tongue 604 approaches the wheel 609. The steering sensors described herein provide an operator with an indication, whether visual, audible, haptic, or otherwise, that a selected steering amount (e.g., a steering limit) is approaching or has been reached. Thus, safety of operating an agricultural header transport system is increased, and a risk of damage to the agricultural header transport system is reduced.

Figure 7:
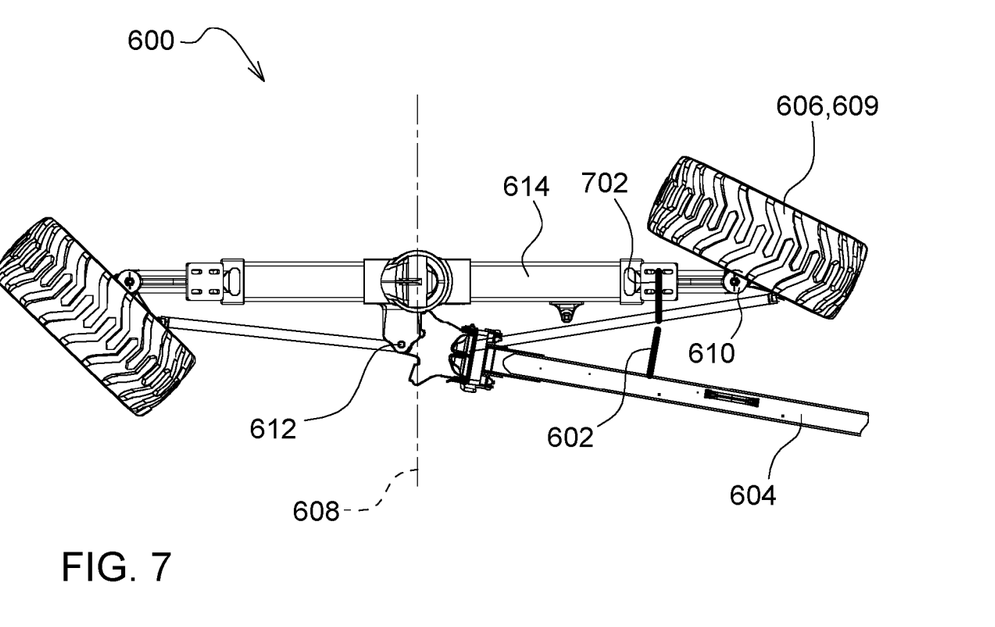
FIG. 7 is a plan view of another example steering system that includes a rod arranged to contact another component when a select amount of pivoting of a tongue of the steering system has occurred, according to some implementations of the present disclosure.

FIG. 7 is a plan view of another example steering system 700 in which the rod 602 is arranged to contact another portion of the steering system 700. In this example, the rod 602 is positioned on the tongue 604 to contact a protrusion 702 coupled to and extending from the beam 614. In other implementations, the protrusion 702 may be coupled to another portion of the steering system 700 or another component of an associated agricultural header transport system.

Figure 8:
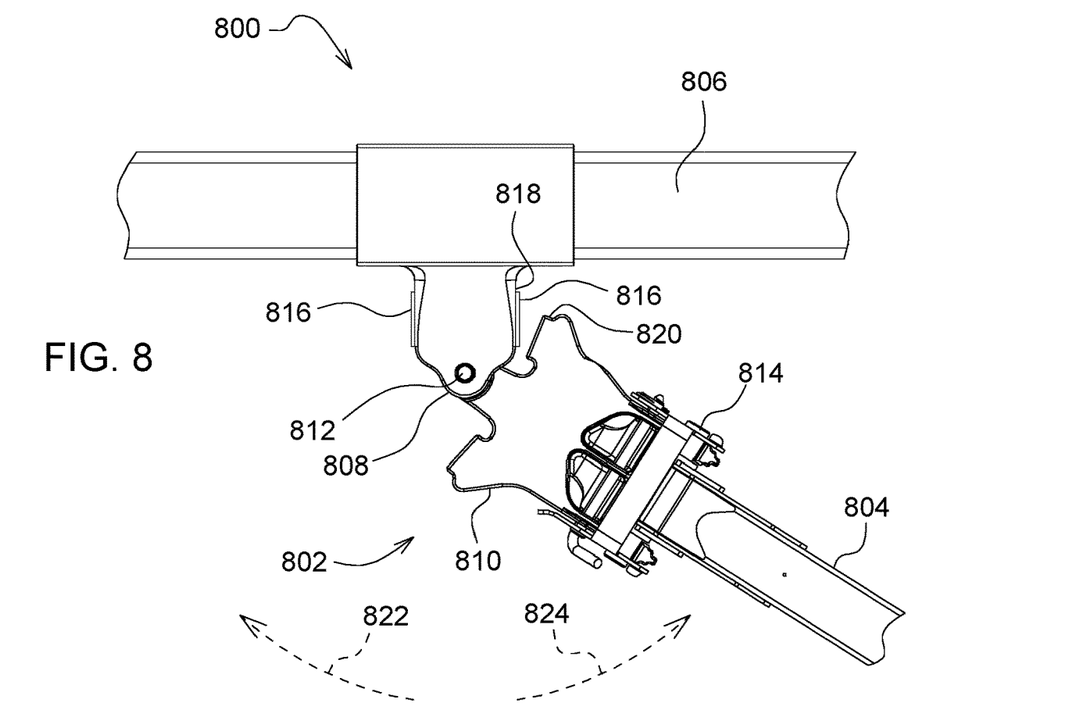
FIG. 8 is a detail view of another example steering system that includes contact sensors to detect an amount of articulation of the steering system, according to some implementations of the present disclosure.

FIG. 8 shows a detail view of another example steering system 800 of an agricultural header transport system. FIG. 8 shows a hinge 802 that provides a pivotable connection between a tongue 804 and a beam 806 of the steering system 800. The hinge 802 includes a first hinge component 808 coupled to the beam 806 and a second hinge component 810 coupled to the tongue 804. The first and second hinge components 808 and 810 are connected by a pin 812. The tongue 804 is pivotably connected to the second hinge component 810 via pin 814. A contact sensor 816 is provided on a surface 818 of the first hinge component 808. A portion 820 of the second hinge component 810 contacts the contact sensor 816 when the hinge 802 reaches an angular displacement limit. In other implementations, the contact sensor 816 is provided on the portion 820 of the second hinge component 810, and the contact sensor 816 contacts the surface 818 of the first hinge component 808 when the angular displacement limit is reached. Additionally, a contact sensor 816 is provided on both lateral sides of the hinge 802, as shown in FIG. 8, in order to identify a steering limit in both directions of articulation of the hinge 802, as indicated by arrows 822 and 824.

Figure 9:
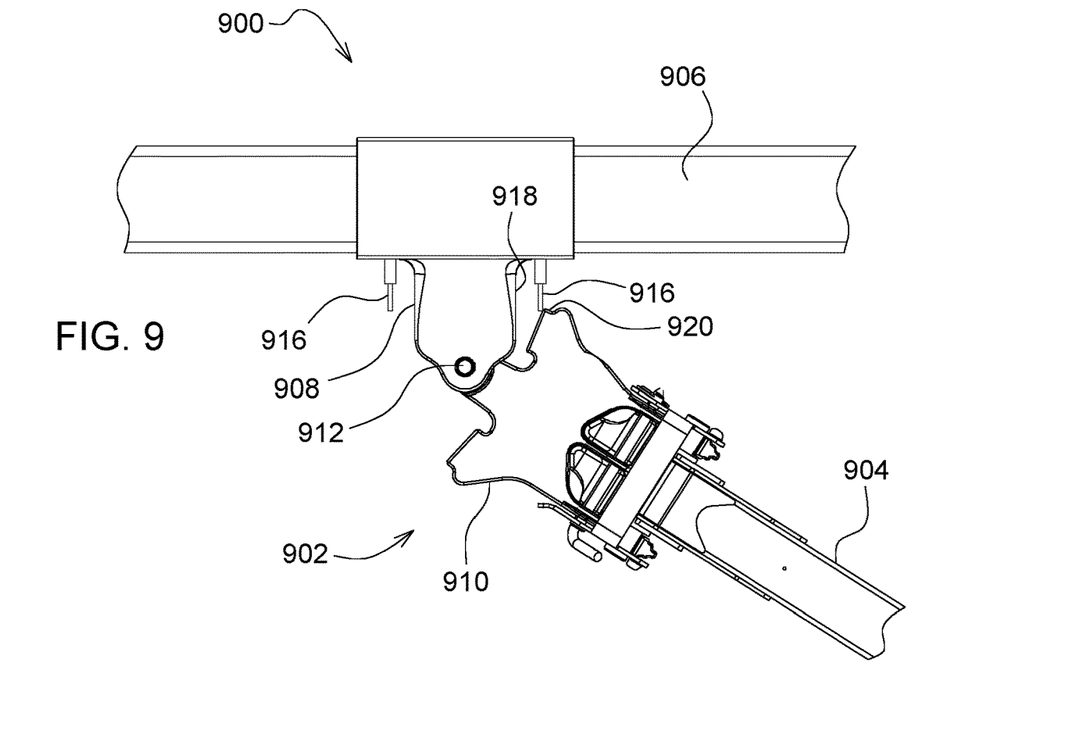
FIG. 9 is a detail view of another example steering system that includes limit switches to detect an amount of articulation of the steering system, according to some implementations of the present disclosure.

FIG. 9 is a detail view of another example steering system 900. The steering system 900 is similar to the hinge system 800 of FIG. 8. In this example, the steering system 900 includes limit switches 916 coupled to beam 906. In other implementations, one or both of the limit switches is provided on a first hinge component 908 or a second hinge component 910 of hinge 902 that pivotably couples a tongue 904 and the beam 906. The first hinge component 908 is coupled to the second hinge component 910 by a pin 912. As the second hinge component 910 approaches a steering limit, the second hinge component 910 engages the limit switch 916. In some instances, the second hinge component 910 displaces the limit switch 916, causing the limit switch to provide a notification that a steering limit is approaching or has been reached. In this example, the steering limit is defined by contact between a surface 918 of the first hinge component 908 and a portion 920 of the second hinge component 910.

Figure 10:
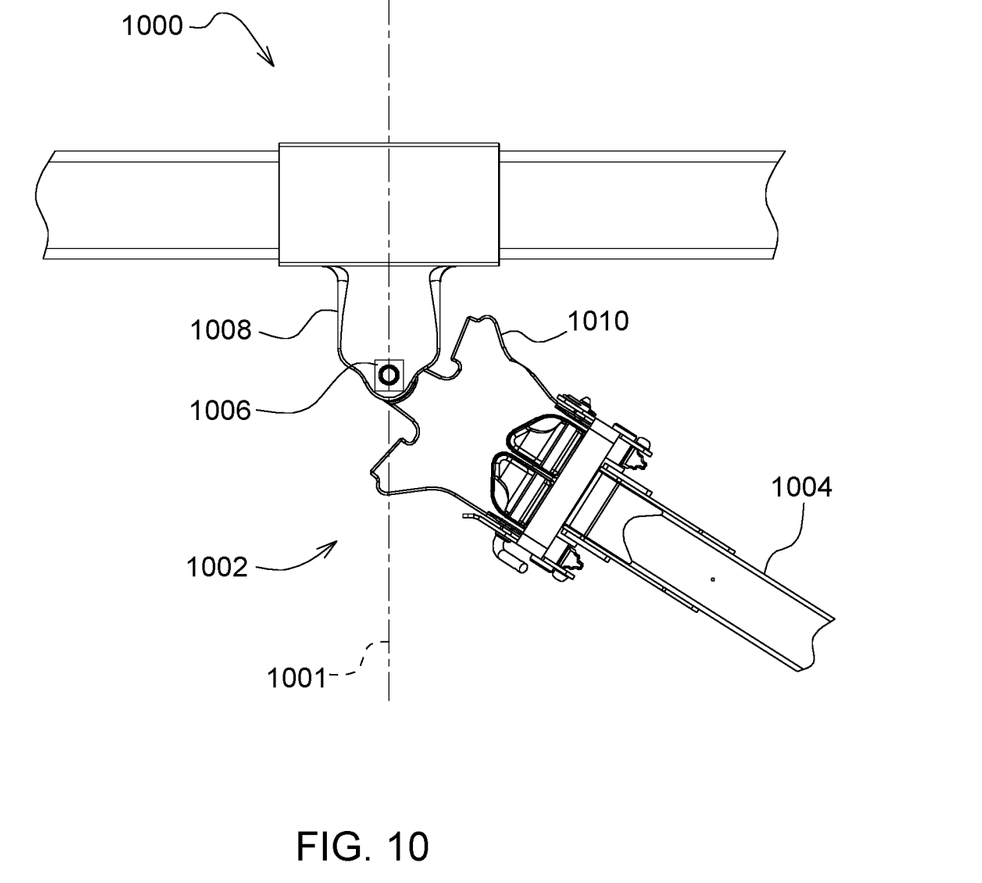
FIG. 10 is a detail view of another example steering system that includes a rotary sensor to detect an amount of articulation of the steering system, according to some implementations of the present disclosure.

FIG. 10 shows another example steering system 1000 that is similar to the steering systems 800 and 900, described earlier, except that the steering system 1000 includes a rotary sensor 1006 that detects an amount of rotation of a first hinge component 1008, similar to the first hinge components 808 and 908, relative to a second hinge component 1010, similar to the second hinge components 810 and 910, of hinge 1002. The rotary sensor 1016 generates a notification that, for example, indicates how far the second hinge component 1010 has rotated relative to the first hinge component 908 from a reference position 1001. In this instance, the reference position 901 corresponds to a straight-ahead or non-turning position of tongue 1004.

In some implementations, the notification generated by a sensor, such as contact sensor 816, limit switch 916, or rotary sensor 1006, is in the form of an electrical signal that generates a visual indication, an audible indication, a haptic indication, or some other type of indication to alert an operator that a steering limit is approaching or has been reached. For example, an electrical signal representing the notification is transmitted to a cabin of a vehicle being used to transport the agricultural header transport system via a wired or wireless connection. Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols. In some instances, the electrical signal is used to illuminate a light, trigger an audible sound, or is transmitted to a display that provides a visual alert to the operator that a steering limit has been reached or is approaching.

An amount of rotation at which a steering sensor within the scope of the present disclosure generates a notification is selected to be any desired amount of articulation of a steering system. For example, as explained above, the steering sensor be configured to generate a notification when a steering limit is reached, such as when one steering component contacts another steering component. In other instances, the steering sensor may be configured to generate a notification when a selected amount of steering articulation has occurred. For example, in some instances, a steering sensor generates a notification when 60%, 65%, 70%, 75%, 80%, 85%, or 90% of full articulation of a steering system has occurred.

Without in any way limiting the scope, interpretation, or application of the claims appearing below, a technical effect of one or more of the example implementations disclosed herein is to avoid over-articulation of a steering system and, consequently, eliminating or reducing the risk of damage to a steering system or associated transport system caused by over-articulation of the steering system. Another technical effect of one or more of the example implementations disclosed herein is to provide an indication to an operator that a selected amount of articulation of a steering system has or is about to occur, thereby providing the operator with notice and the opportunity to avoid over-articulation of a steering system.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An apparatus for detecting a position of a steering system, the apparatus comprising:
    a first component movable with a first steering component; and
    a second component, moveable with a second steering component, that interacts with the first component to indicate a position of the steering system and
    wherein said first component comprises a first protruding portion extending from the first steering component.

2. The apparatus of claim 1, wherein the second component comprises a second protruding portion extending from the second steering components and wherein the first protruding portion contacts the second protruding portion to indicate the position of the steering system.

3. The apparatus of claim 1, wherein the first steering component comprises a tongue.

4. The apparatus of claim 1, wherein the second steering component comprises a tread of a tire coupled to the steering system.

5. The apparatus of claim 1, wherein the second component comprises a sensor that engages with the first protruding portion to indicate the position of the steering system.

6. The apparatus of claim 1, wherein the first component comprises a first portion of a rotary sensor and wherein the second component comprises a second portion of the rotary sensor, wherein the first portion of the rotary sensor and the second portion of the rotary sensor are moveable relative to each other.

7. The apparatus of claim 6, wherein the rotary sensor is operable to detect the steering position of the steering system for a movement of the first portion of the rotary sensor relative to the second portion of the rotary sensor.

8. The apparatus of claim 1, further comprising an indicator that generates a notification of the position of the steering system upon interaction of the first component and the second component.

9. The apparatus of claim 8, wherein the indicator comprises one of an audible indication, a visual indication, or a haptic indication.

10. The apparatus of claim 1, further comprising a signal generated by the interaction between the first component and the second component, the signal being transmitted to the indicator via a wired or wireless connection.

11. An agricultural header transport system comprising:
    a first set of traction components disposed at a first end, the first set of traction components comprising a first traction component and a second traction component, the first traction component pivotable about a first axis and second traction component pivotable about a second axis different from the first axis;
    a second set of traction components disposed at a second end, opposite the first end;
    a steering system coupled to the first set of traction components, the steering system comprising:
        a tongue pivotably coupled to the first traction component and the second traction component, the first traction component and the second traction component being pivotable about the first axis and the second axis, respectively, in response to a rotation of the tongue; and
        a protrusion extending from the tongue that contacts a portion of the agricultural header transport system at a selected amount of rotational displacement of the tongue.

12. The agricultural header transport system of claim 11, wherein the portion of the agricultural header transport system comprises one of the first traction component or the second traction component.

13. The agricultural header transport system of claim 12, wherein the protrusion comprises a flexible rod configured to elastically deform in response to contact with the first traction component or the second traction component.

14. The agricultural header transport system of claim 11, wherein the steering system further comprises a beam extending between the first traction component and the second traction component and wherein the portion of the agricultural header transport system comprises a protrusion extending from the beam.

15. The agricultural header transport system of claim 11, wherein the selected amount of rotational displacement of the tongue comprise an amount of rotational displacement less than a full amount of rotational displacement of the tongue.

\* \* \* \* \*